United States Patent [19]

Ganguli

[11] Patent Number: 4,621,069

[45] Date of Patent: Nov. 4, 1986

[54] CONTINUOUS PROCESS FOR CATALYST REGENERATION BY STAGED BURNOFF OF CARBON AND SULFUR COMPOUNDS

[75] Inventor: Partha S. Ganguli, Mercer County, N.J.

[73] Assignee: HRI, Inc., Gibbsboro, N.J.

[21] Appl. No.: 538,316

[22] Filed: Oct. 3, 1983

[51] Int. Cl.[4] .................. B01J 38/24; B01J 38/26; B01J 38/22; B01J 23/84

[52] U.S. Cl. .................. 502/45; 208/176; 208/216 R; 422/223; 502/21; 502/46; 502/47; 502/48; 502/49; 502/517

[58] Field of Search .................. 502/21, 45–49, 502/516, 517; 422/223; 208/176, 216, 217

[56] References Cited

U.S. PATENT DOCUMENTS

| | | | |
|---|---|---|---|
| 1,440,194 | 12/1922 | Wijnberg | 502/47 |
| 1,943,976 | 1/1984 | Lewers | 502/45 |
| 2,304,398 | 12/1942 | Campbell | 422/223 |
| 2,436,340 | 2/1948 | Upham et al. | 502/21 |
| 2,457,837 | 1/1949 | Simpson et al. | 502/47 |
| 2,579,834 | 12/1951 | Kollgaard | 502/47 |
| 2,723,949 | 11/1955 | McCausland | 208/176 |
| 3,533,960 | 10/1970 | Weinert | 502/49 |
| 3,764,558 | 10/1973 | Tse | 502/52 |
| 4,007,131 | 2/1977 | Gillespie et al. | 502/52 |
| 4,026,821 | 5/1977 | Schoofs et al. | 422/223 |

*Primary Examiner*—P. E. Konopka
*Attorney, Agent, or Firm*—Fred A. Wilson

[57] ABSTRACT

Used catalyst containing carbon and sulfur deposits is continuously regenerated by staged burnoff of the carbon and sulfur using a multiple zone treatment vessel containing thin beds of catalyst. The catalyst is exposed to successively increased temperatures and oxygen concentrations to effectively remove substantially all the carbon and sulfur deposits. The used catalyst can be that removed from hydroconversion processes, such as from H-Oil, H-Coal and fluid catalystic cracking processes, and processed in a multizone treatment vessel in combination with proper auxiliary heating equipment for continuous step-wise regeneration of the catalyst. Operating conditions of catalyst temperature, oxygen concentration of gas, and catalyst residence time in each stage of the catalyst regeneration process are carefully controlled to provide staged burnoff of carbon and sulfur deposits for superior regenerated catalyst results. The hot regenerated catalyst withdrawn from the last zone is cooled against make-up air to improve the overall thermal efficiency of the process.

14 Claims, 5 Drawing Figures

CONTINUOUS PROCESS FOR CATALYST REGENERATION BY STAGED BURNOFF OF CARBON AND SULFUR COMPOUNDS

BACKGROUND OF INVENTION

The present invention pertains to a process for effective regeneration of used catalyst to remove deposited carbon and sulfur compounds by staged controlled burnoff. It pertains particularly to a continuous process in which the used carbon-coated catalyst is successively contacted by hot gas streams at increasing temperature levels and containing increasing $O_2$ concentrations in multiple zones to effectively burn off the carbon and sulfur compounds.

Cataysts deactivated by carbon deposition in hydroconversion processes can be regenerated by in-situ carbon burnoff in a controlled oxidative atmosphere in fixed bed, or fluidized bed apparatus. For example, U.S. Pat. No. 4,007,131 to Gillespie, et al shows a process for regenerating catalyst from hydroprocessing operations in a reactor by passing hot inert gas containing 0.1–4.0 V% oxygen through the catalyst while in-situ in the reactor. However, such in situ catalyst regeneration requires shutdown of the reaction process for the time needed to perform the regeneration, which may require many hours. Also, some channelling of the hot gas flow in the catalyst bed usually occurs and results in undesired variations in the degree of catalyst regeneration achieved. Thus, more effective external catalyst regeneration procedures not requiring process shutdown have been sought. However, available external type commercial catalyst regeneration processes have not used apparatus which can maintain good control of gas temperatures and oxidative atmospheres. Consequently, the quality of catalyst regeneration from external type systems is not entirely satisfactory. Catalysts regenerated by these processes have only moderate recovery of pore volume and surface area and have high content of sulfate sulfur, which is a poison for the catalyst. Also, the existing catalyst regeneration processes are costly because of the huge apparatus used for the carbon burnoff.

SUMMARY OF INVENTION

The present invention provides a process in which used catalyst deactivated by depositiion of carbonaceous matter and sulfur compounds on the catalyst particles is continuously regenerated ex-situ by staged burnoff of the carbon and sulfur at controlled temperature and in a controlled gas atmosphere containing a dilute concentration of oxygen in thin beds of the catalyst in a multiple zone treatment vessel. The used catalyst can be that removed from hydrogenation processes for coal or petroleum feedstocks, such as from H-Coal and H-Oil processes or from fluid catalytic cracking processes for heavy petroleum fractions. The used catalyst is introduced into a multiple zone catalyst heat treatment vessel used in combination with gas preheating equipment to provide a process for continuous regeneration of the catalyst. Each catalyst regeneration zone is arranged to be independently maintained at the desired temperature not exceeding about 850° F. and at gas flow rates and an oxygen concentration not exceeding about 6 V% oxygen to achieve effective and efficient burnoff of the carbon and sulfur deposits on the used catalyst without damage to the catalyst. This multiple zone heating arrangement is accomplished by heating the gas in a preheating step to the highest temperature needed in the last regeneration zone, then bypassing the heater with a portion of the gas as needed to provide the desired temperature in the preceeding lower temperature catalyst regeneration zones. The gas provided in the first zone is inert, i.e., contains no oxygen. The desired oxygen concentration for the gas in each succeeding zone is achieved by adding sufficient make-up air to the gas flow to each zone.

A major portion of the hot gases exiting from each regeneration zone is recycled to the heater, and the remainder is passed through a gas clean-up step for removal of oxides of carbon, nitrogen and sulfur before the gas is discarded to the atmosphere. The portion of hot gas recycled to the carbon burnoff step will depend on the oxygen concentration desired in each zone, and will usually be between about 80 and 95 V% of the total gas flow with the volume of gas discarded being substantially equal to the volume of make-up air needed.

The resulting hot regenerated catalyst is withdrawn from the last zone of the catalyst regneration vessel at 780°–850° F. temperature, and is preferably cooled by heat exchange with the make-up air used to provide the oxygen content in the hot gas streams supplied to each catalyst regeneration zone.

The process of the invention can be carried out in various multi-zone treatment vessel arrangements, such as a vertical vessel arrangement having multiple rotating trays or in a horizontal vessel configuration in which the catalyst is moved through the successive zones by screw conveyor or belt conveyor means. However, the process is preferably performed in a vertical multi-zone treatment vessel having the first zone at the upper end, and having multiple rotating trays in each zone for carrying the catalyst in thin beds through the successive zones for contacting and heating the catalyst by the hot gas for regeneration of the catalyst.

More specifically, the present invention provides a process for continuous regeneration of used catalyst containing carbon and sulfur desposits by staged burnoff in multiple zones, comprising introducing used particulate catalyst containing carbon and sulfur deposits into a first zone of a multiple zone regeneration vessel, and maintaining the catalyst in said zone at 300°–500° F. temperature by contacting the catalyst with an inert gas for 1–2 hours residence time to evaporate lower boiling liquid components from the catalyst; passing the oil-free catalyst from said first zone to a second zone and maintaining the catalyst in said second zone at 780°–800° F. temperature by contacting the catalyst in thin beds with a gas flow containing 0.5–1.0 V% oxygen in an inert gas for 4–6 hours residence time to partially burn off carbon and sulfur deposits from the catalyst; passing the partially regenerated catalyst from said second zone to a third zone and maintaining the catalyst in said third zone at 800°–850° F. temperature by contacting the catalyst in thin beds with a gas flow containing 1–2 V% oxygen in an inert gas for 4–6 hours residence time to further burn off carbon and sulfur deposits from the catalyst; passing the further regenerated catalyst from said third zone to a fourth zone and maintaining the catalyst therein at 800°–850° F. temperature by further contacting the catalyst with a gas flow containing 2–6 V% oxygen in an inert gas for 6–10 hours residence time to complete burnoff of carbon and sulfur deposits from the catalyst; and withdrawing the regenerated catalyst from said fourth zone for further usage. The hot gas is withdrawn from the second, third, and fourth zones, a major portion is reheated and recycled to the zones, and the remaining gas is cleaned to remove oxides of carbon, nitrogen and sulfur before discharging the cleaned gas to the atmosphere.

It is an advantage of the present invention that the used catalyst is regenerated completely and effectively by first using evaporation of hydrocarbon liquids from the catalyst, followed by staged burnoff of the carbon and sulfur deposits in thin beds in multiple zones operated at successively increased temperatures and oxygen concentrations. Also, the oxygen concentration of the regeneration gas is limited to only about 6 V % oxygen so as to prevent oxidation of the sulfur on the used catalyst to undesired sulfate forms.

DESCRIPTION OF INVENTION

Figure 1:
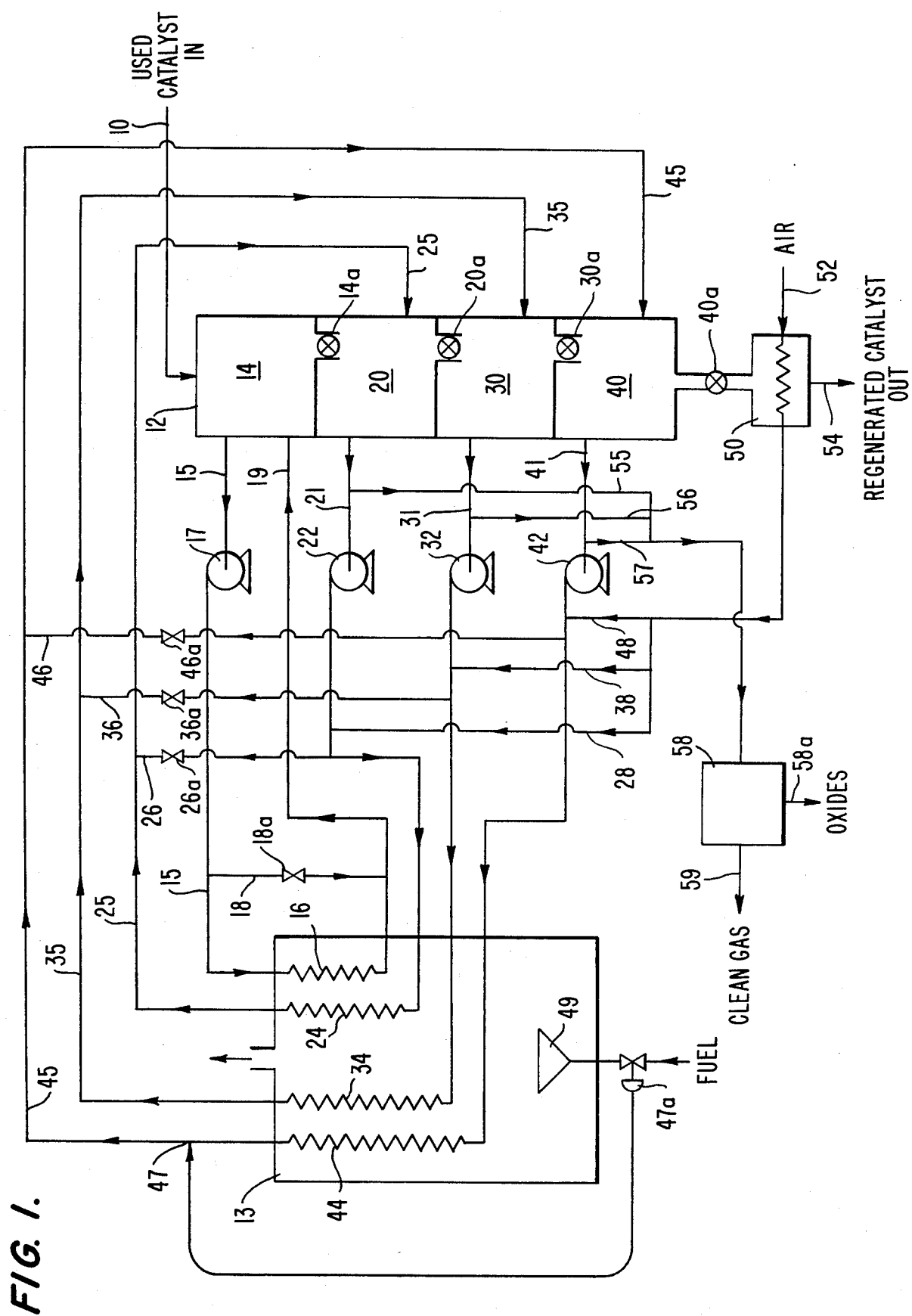
FIG. 1 is a schematic diagram showing a continuous staged catalyst regeneration process and system having multiple controlled temperature zones in a vertical heat treatment vessel.

Referring to FIG. 1, the used catalyst containing deposits of carbonaceous matter and sulfur compounds, either in its "as is" condition from a hydrogenation process or in a partially processed form such as acid-treated, is fed at 10 by suitable conveying means such as a belt conveyor into a vertical treatment vessel 12 containing multiple zones. In the heat treatment vessel 12, each zone contains a plurality of slowly rotating trays and the used catalyst to be regenerated is placed first on the top rotating tray and is leveled to a thin bed having uniform thickness of about 0.5–2 inch. Hot gases having the desired controlled temperature and oxygen concentration are flowed over and through the beds of catalyst by means of radially outwardly directed turbo fans or nozzles associated with each zone. In the treatment vessel zones, the catalyst particles on each tray are heated to the desired temperature by contact with the hot gas, and the heated catalyst is slowly moved to the next lower tray, where the regeneration process step is continued to attain the necessary residence time for further regeneration of the catalyst.

The catalyst temperature is successively increased in each zone up to about 850° F. maximum temperature to avoid damage to the catalyst. The oxygen concentration in each zone is also successively increased up to only about 6 V % $O_2$ maximum, so as to avoid oxidation of the sulfur compounds contained on the used catalyst to produce undesired sulfate forms, which cannot be reconverted to desired sulfide forms during use of the regenerated catalyst.

As shown in FIG. 1, the catalyst regeneration process is carried out in the multi-zone heat treatment vessel 12, which is preferably divided into four separate sections or zones. The top zone 14 is used for evaporating away and removing any low boiling hydrocarbon liquid components retained on the spent catalyst, using a moderate catalyst temperature of at least about 300° F. and usually not exceeding about 500° F. A flow of hot inert gas such as nitrogen or flue gas having no oxygen content is passed over and through the thin beds of spent catalyst each about 0.5" to 2" thick to heat the catalyst and evaporate off the hydrocarbon liquid. Residence time for the catalyst in this first evaporation zone is usually about 1 to 2 hours.

The oil-free catalyst from zone 14 is then passed through a rotary feeder valve 14a into the next lower second zone 20 for initial controlled oxidation of the carbon and sulfur deposits on the oil-free catalyst at a catalyst bed temperature of 780° to 800° F. with a gas flow containing 0.5 to 1.0 V % oxygen in nitrogen or flue gas passed over and through the catalyst. Residence time for catalyst in this zone is approximately 4 to 8 hours. Feeder valve 14a serves to prevent the oxygen-containing gas in the second zone from entering the first zone, because the catalyst in the first zone contains oils which would undesirably be ignited and burned at a high rate if oxygen was present therein.

The next lower third zone 30 is for further controlled oxidation of the catalyst withdrawn from the second zone, at a catalyst bed temperature of 800°–850° F. and using an oxidizing gas flow containing 1 to 2 V % oxygen in nitrogen or flue gas passed over and through the catalyst. Catalyst residence time in this zone is approximately 4 to 6 hours.

The last and lowermost zone 40 of the catalyst regeneration vessel 12 is for final controlled oxidation of the carbon and sulfur on the catalyst at a catalyst bed temperature of 800°–850° F. using a gas flow containing 2 to 6 V % oxygen in nitrogen or flue gas passed over and through the catalyst. Catalyst residence time in this last zone is approximately 6 to 10 hours, and burnoff of carbon and sulfur compounds and regeneration of the used catalyst is completed in this zone. The resulting regenerated catalyst usually contains less than about 0.5 W % carbon and less than about 0.5 W % sulfur.

As further shown in FIG. 1, the desired catalyst temperature is maintained in each zone of the heat treatment vessel 12 by circulating a hot gas stream from each zone through a heater 13 and back to the zones. For the first zone 14, the gas stream 15 is withdrawn and recirculated by blower 17 and heated in heater passage 16 to about 500° F., with the gas temperature at supply stream 19 being controlled by use of a bypass conduit 18 containing control valve 18a. For the second zone 20, gas stream 21 is withdrawn and recirculated by blower 22 and heated in passage 24 of heater 13, and the temperature of supply stream 25 is controlled by bypass conduit 26 containing control valve 26a. The oxygen concentration in zone 20 is controlled at 0.5–1.0 V % by adding make-up air from stream 28 as needed.

For the next lower third zone 30 of vessel 12, gas stream 31 is withdrawn and recirculated by blower 32 and heated in passage 34 of heater 13 and the temperature of supply stream 35 to zone 30 is controlled by bypass 36 containing valve 36a. The oxygen concentration in zone 30 is maintained at 1–2 V % by adding make-up air at 38 as needed.

For the highest temperature zone 40 of catalyst treatment vessel 12, gas stream 41 is withdrawn and recirculated by blower 42 and heated in passage 44 of heater 13, to the temperature desired for supply stream 45 to zone 40. The oxygen concentration in zone 40 is maintained at 2-6 V % by adding sufficient make-up air at conduit 48. The desired temperature for gas stream 45 is maintained by use of sensing means 47, which is arranged to operate valve 47a and thereby control the fuel supply to burner 49 for heater 13.

The regenerated catalyst is next removed from zone 40 through rotary valve 40a and is suitably conveyed, such as by a belt or screw means (not shown), to a cooling chamber 50 where the hot catalyst is cooled against the make-up air stream 52. Such cooling of the hot regenerated catalyst by heat exchange against the make-up air flow improves the overall thermal efficiency of the catalyst regeneration system. The cooled catalyst at 54 is then screened by a screening step (not shown) to remove undesired fine particles before storage of the remaining regenerated catalyst as needed prior to its reuse in a catalytic process.

A major portion of the hot gases exiting from each catalyst regeneration section or zone is mixed with the make-up air streams and heated at heater 13 before recirculating the gas to each section or zone of the regeneration vessel for reuse, and the remaining gas is discharged. The discharged gas streams at 55, 56 and 57 are combined and processed in a gas cleaning step 58 to remove oxides of carbon, nitrogen and sulfur at 58a before discarding the cleaned gas to the atmosphere at 59.

Figure 2:
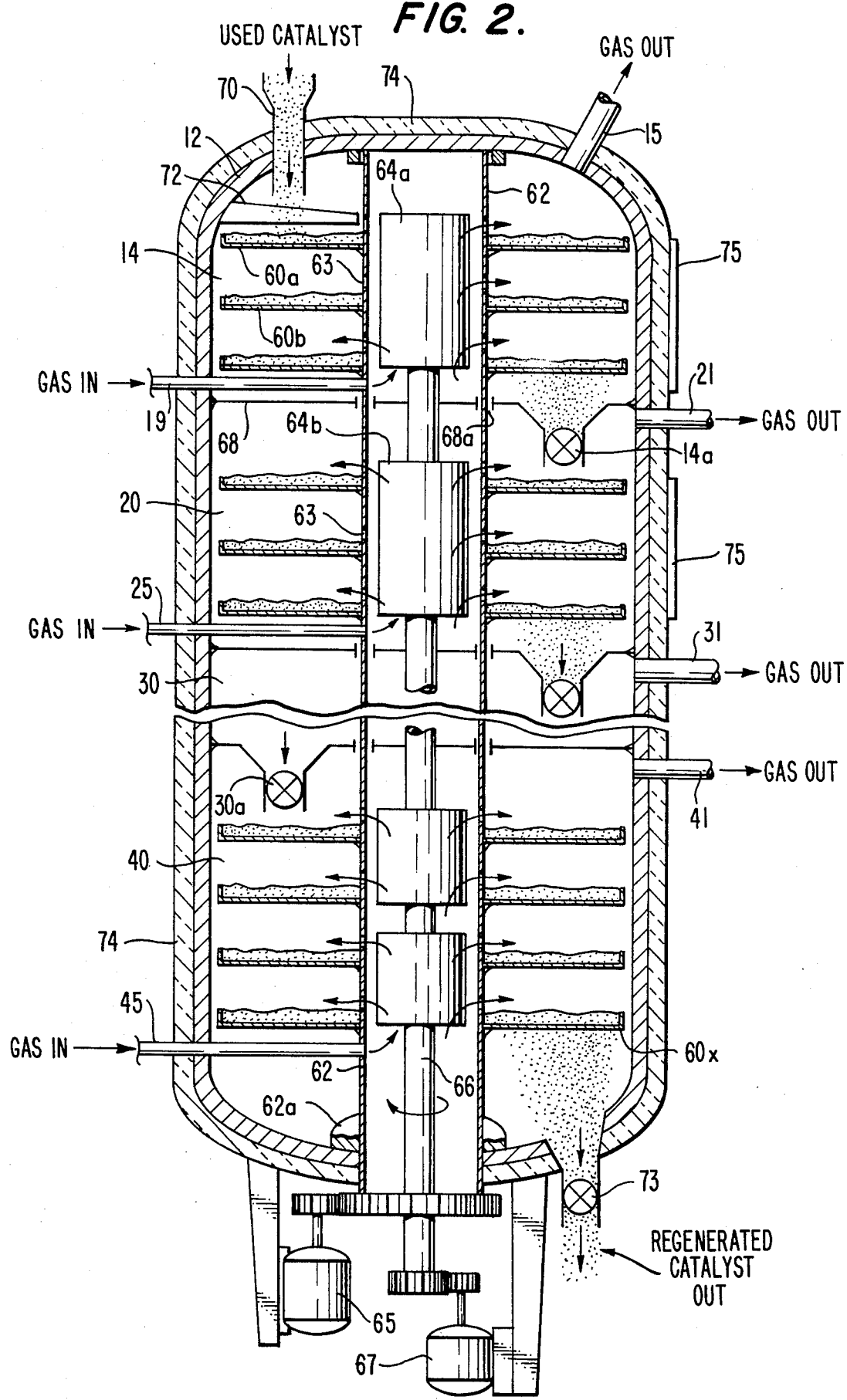
FIG. 2 is a cross-sectional view of a vertical turbo treatment unit showing some details of the tray configuration and operation.

The used catalyst being heated and regenerated in each zone of treatment vessel 12 is carried on multiple rotating annular-shaped trays 60a, 60b, etc., as shown in more detail in FIG. 2. Each zone contains 2-6 trays, and each tray is rotatably supported at its inner diameter by a cylinder 62 supported by flange 62a within the vessel 12. Hot gas is supplied into each zone as described above and is circulated radially outwardly across each tray by suitable means such as rotary fans 64a, 64b, etc., which are centrally located within the central opening in the trays. The height of each fan 64 is usually sufficient to provide gas flow radially outwardly across 2-3 adjacent trays. The gas passes radially outwardly through circumferentially spaced openings 63 in support tube 62. The velocity of gas flowing radially across each tray should be sufficient for the gas flow to reach the outer periphery of each tray, but not excessive so as to blow or entrain any of the catalyst particles off the trays. Appropriate gas velocities are in a range of about 0.20-1.0 ft/sec. Tray spacing between the adjacent trays will usually be 3-6 inches. The rate of rotation for each tray will usually depend upon the desired residence time for the catalyst in each zone, and will usually be 1-4 revolutions per hour, thus requiring an elapsed time of 15-60 minutes per tray revolution.

The trays 60a, 60b, etc., are rotated by suitable drive means 65, such as a motor-driven pinion and gear set located below the regenerator vessel 12. Also, the fans 64 are driven by an elongated central drive shaft 66 connected to suitable drive means 67, such as an electric motor-driven pinion and gear also located below the regenerator vessel 12.

To separate each zone of vessel 12 from the adjacent zone, a baffle 68 is provided between the trays between first zone 14 and second zone 20, and extends inwardly from the vessel wall to near the tray support cylinder 62. The catalyst is preferably passed from each zone downwardly to the next zone through a driven rotary valve 14a which prevents back flow of gas between zones and thereby controls the oxygen concentration in each zone at the desired level. The hot gas streams usually enter each zone at near the lower end of the zone and flow through conduits 19, 25, 35 and 45, to each fan inlet. Gas is removed from each zone near their upper ends, through conduits 15, 21, 31, and 41, thereby providing substantially counter-current flow of the hot gases with the catalyst in each zone. The gas introduced at conduit 19 is inert, i.e., contains no oxygen, so that a suitable seal 68a is provided for baffle 68 to exclude oxygen containing gas in the second zone 20 from entering the first zone 14. A similar baffle 69 and seal 69a are provided between the adjacent zones 20 and 30, as well as between zones 30 and 40.

In operation, the used catalyst is first introduced into treatment vessel 12 through opening 70 onto the uppermost rotating tray 60a. The catalyst is levelled on each tray by stationary bar 72 to a desired uniform height of 0.5-2 inch. After almost one revolution on each tray, the catalyst is transferred downwardly to the next lower tray where the heating and regeneration step is repeated. The baffles which separate the adjacent zones are each provided with a suitable opening and rotary seal valves through which the catalyst falls onto the top tray in the next lower zone. The burner 49 of heater 13 is operated to maintain the temperatures of gas stream 45 supplied to zone 40 at the desired level. From the lowermost tray 60x, the hot regenerated catalyst is withdrawn through rotary valve 73 and is preferably transferred to a catalyst cooling step as previously described before its reuse in a catalytic process, such as for the hydrogenation of hydrocarbon feedstocks.

Because the catalyst regeneration temperatures are usually 600°-850° F., the walls of vessel 12 are thermally insulated at 74 to minimize heat losses from the vessel. Removable insulated panels 75 are provided in the walls 74 for gaining access to the rotating trays for inspection and servicing, as required. Also, additional heating means, such as electrical heaters or steam coils, can be provided adjacent the vessel wall within each zone of the regenerator vessel 12 to help maintain the gas temperature in each zone within the desired ranges.

Figure 3:
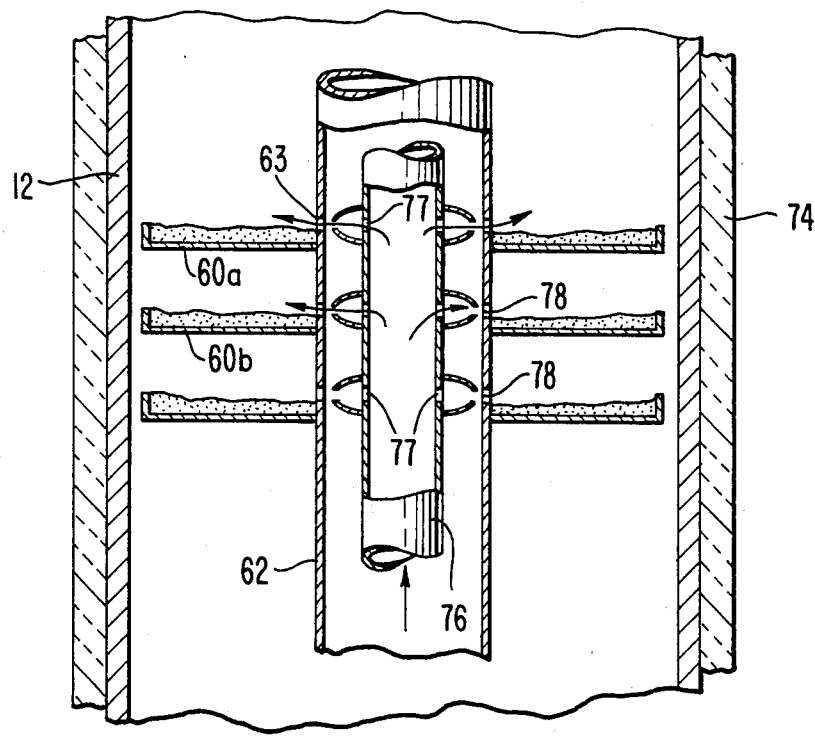
FIG. 3 is a partial cross-sectional view of an alternative arrangement for supplying gas to a vertical heat treatment vessel.

In an alternative arrangement for the FIG. 1 embodiment, the hot gas contacting the catalyst on each rotary tray 60a, 60b, etc., can be supplied through nozzles, as is generally shown in FIG. 3. The hot gas to each zone is supplied to a central conduit 76, from which gas is passed through one or more circumferentially spaced openings 77, and then through a radially oriented nozzle 78, provided adjacent or opposite the inner annular surface of each tray. Each nozzle 78 is adapted to direct the gas flow radially outwardly across each tray at a velocity sufficient for the gas to reach the outer periphery of the tray, but no excessive so as to entrain and remove any catalyst particles from the tray. Suitable gas velocities are about 0.20-1.0 ft/sec. A separate conduit containing multiple nozzles is provided for supplying the hot gas to each zone, with suitable seals being provided between the adjacent zones as mentioned hereinabove to control and maintain the desired oxygen concentrations therein.

The catalyst regeneration process of the present invention can also be carried out in other type multiple zone regeneration equipment than the vertical multi-zone treatment vessel described above for FIGS. 2 and 3. In an alternative embodiment of the invention shown in FIG. 4, the used catalyst at 80 is contacted by a hot inert gas provided at 81 in first zone 14, consisting of a vertical vessel 82 containing a fluidized bed 83 through which the hot gas is passed upwardly to heat and evaporate hydrocarbon liquid from the catalyst. The resulting oil-free catalyst is passed downwardly through rotary valve 84 to a horizontal multi-zone thermally-insulated vessel 85 containing zones 20, 30, and 40. Separate gas streams 86, 87, and 88 having the desired temperatures and oxygen concentrations are supplied to each zone of vessel 85 and withdrawn similarly as described for FIGS. 1 and 2. The catalyst is carried through the multiple zones of the horizontal heat treatment vessel 85 by means of screw conveyor 90 driven by rotary drive means 91, such as an electric motor. Baffle 92 is provided to separate the second and third zones, with the catalyst passing through an opening 92a located below the baffle. Similarly, a baffle 93 and opening 93a are provided between the third and fourth zones.

The catalyst particles are stirred and contacted intimately by the hot gas in each successive zone and are heated to the desired temperature by the hot gases passing generally counterflow to the catalyst for effective burnoff of the carbon and sulfur deposits on the catalyst. The catalyst in each zone is thus maintained at the desired temperature, oxygen concentrations, and residence time sufficient to substantially remove the carbon and sulfur deposits. The regenerated catalyst is then withdrawn from the last zone through rotary valve 94 and passed to a heat recovery step (not shown) where it is cooled against the make-up air, similarly as for the FIG. 1 embodiment.

Figure 4:
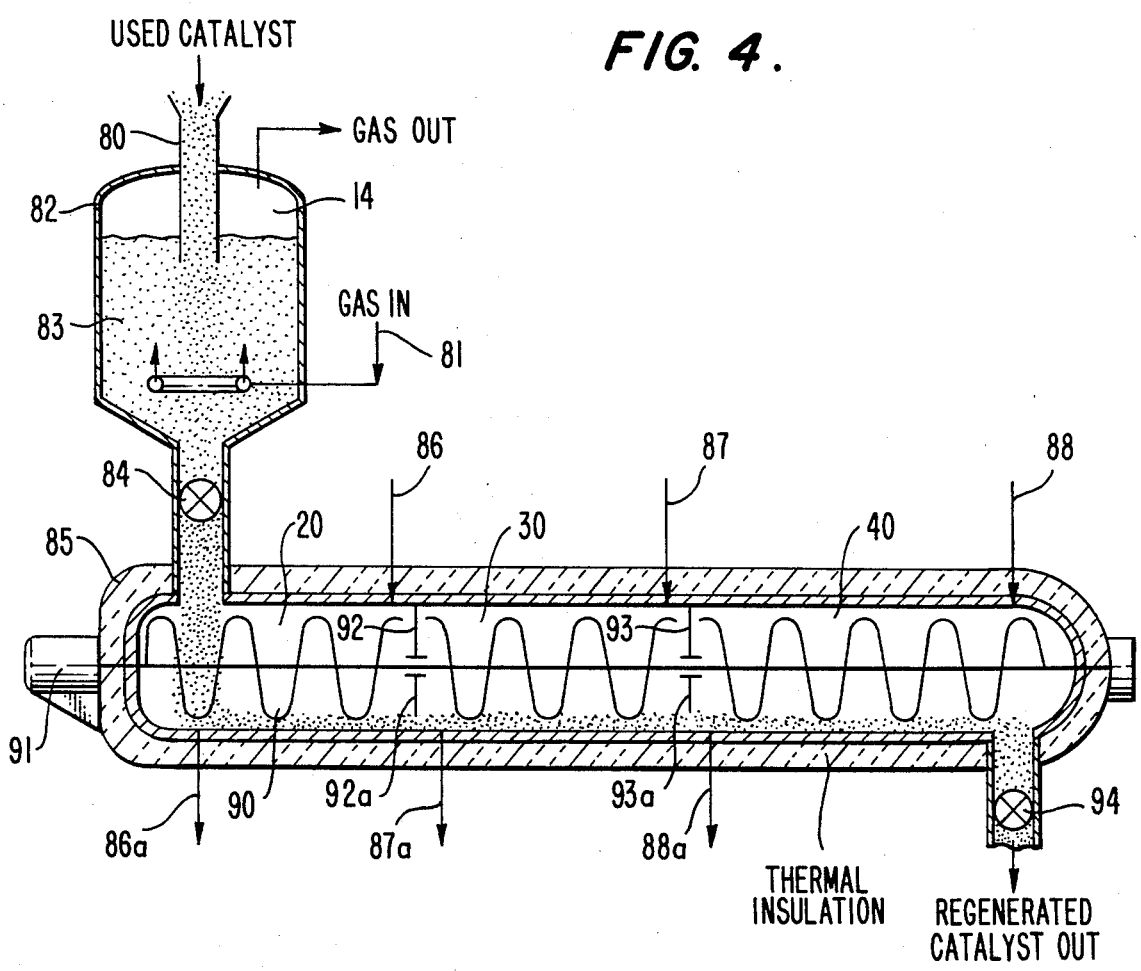
FIG. 4 shows a schematic cross-sectional view of an alternative staged catalyst treatment system using a screw conveyor for conveying the catalyst horizontally through the regeneration vessel zones.
Figure 5:
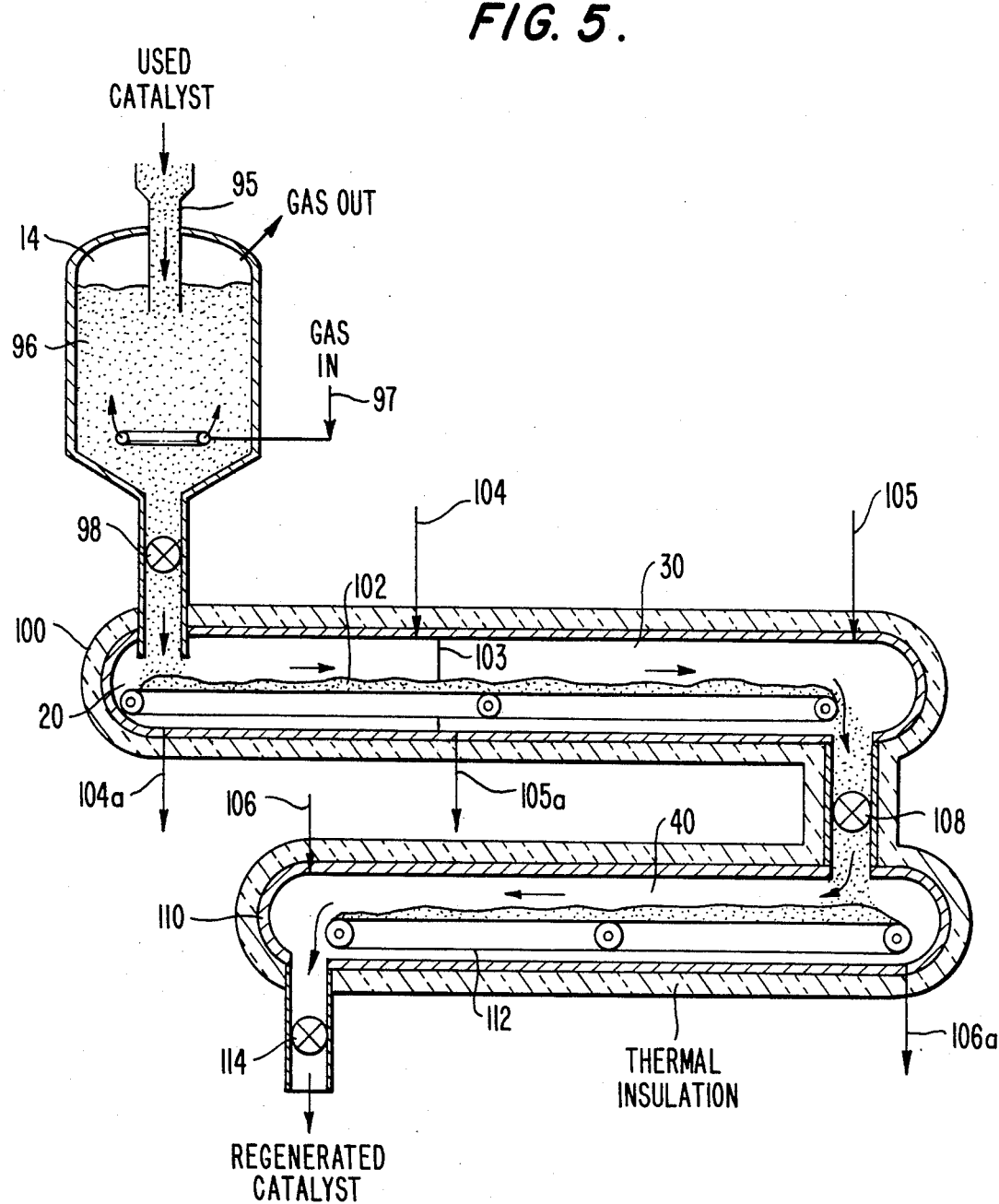
FIG. 5 shows a schematic cross-sectional view of another alternatively staged catalyst treatment system using a conveyor belt for moving the catalyst horizontally through the regeneration vessel zones.

In another alternative embodiment of the present invention, as generally shown in FIG. 5, the used catalyst provided at 95 is contacted in first zone 14 comprising a fluidized bed 96 through which a hot inert gas supplied at 97 is passed upwardly to heat and evaporate hydrocarbon liquid from the catalyst, similarly as for the FIG. 4 embodiment. The oil-free catalyst is then passed through rotary valve 98 to horizontal thermally-insulated treatment vessel 100, and is carried on a moving belt 102 through zones 20 and 30 within the horizontal treatment vessel, the zones being separated by partition 103. The catalyst depth on the belt 102 is maintained at only about 0.5–2.0 inch. Separate heated gas streams 104, 105 and 106 are introduced into the multiple zones and withdrawn similarly as for the FIG. 4 arrangement. The belt 102 is preferably vibrated so that the moving catalyst particles are contacted by the hot gas in each zone for staged burnoff of the carbon and sulfur deposits on the catalyst at successively increased temperatures and oxygen concentrations. The catalyst residence time in each zone is maintained at the desired time by varying the zone length and by controlling the belt speed in each zone.

From zone 30, the heated and partly regenerated catalyst is pased through valve 108 to zone 40, which consists of horizontal vessel 110 containing moving belt 112 for further heating and burnoff of carbon and sulfur from the catalyst by hot gas stream 106. The regenerated catalyst is then withdrawn from the last zone 40 through rotary valve 114 and passed to a cooling step (not shown) before reuse of the catalyst.

This invention will now be further described by reference to the following example, which should not be construed as limiting in scope.

EXAMPLE

Spent catalyst comprising cobalt-molybdenum on alumina, which was removed from an H-Oil Process processing a Middle East petroleum crude, was subjected to the present carbon and sulfur burnoff process in a simulated vertical turbo heat treatment vessel at 800–820° F. temperature while exposed to a gas flow consisting of 4–8 V % oxygen in nitrogen gas. Comparison results are provided in Table 1.

TABLE 1
COMPARISON OF USED AND REGENERATED CATALYSTS

| USED CATALYSTS | |
|---|---|
| Composition | Cobalt-moly on alumina |
| Catalyst Age, bbl/lb | 8.0 |
| Pore Volume, cc/gm | 0.25 |
| Surface Area, M2/gm | 53 |
| Carbon Deposit, W % | 17 |
| Metals Deposits, W % | 12.9 |
| Sulfur, W % | 13.9 |
| Attrition Loss, % | 3.6 |
| Crush Strength, lbs/mm | 2.0 |
| REGENERATED CATALYST | |
| Carbon Deposits, W % | 0.19 |
| Sulfur, W % | 0.4 |
| Pore Volume, cc/gm | 0.6 |
| Surface Area, M2/gm | 182 |
| Oil Penetration, % of Diam. | 50 |
| Crush Strength, lbs/mm | 1.77 |
| Attrition Loss, W % | 6.0 |

These results show that used catalyst removed from a petroleum hydrogenation operation was successfully regenerated by staged burnoff of carbon and sulfur deposits with high removal of the carbon and sulfur and high recovery of catalyst pore volume and surface area with no significant loss of particle physical or crush strength. It is expected that regeneration of used catalysts in an actual vertical turbo heat treatment vessel, better control of temperature and oxygen concentration can be maintained in each zone and even higher pore volume and surface area for the regenerated catalyst can be obtained.

Although this invention has been described broadly and with reference to certain preferred embodiments thereof, it will be understood that modifications and variations of the process can be made and that some steps can be used without others all within the spirit and scope of the invention, which is defined by the following claims.

I claim:

1. A process for continuous regeneration of used catalyst containing carbon and sulfur deposits by using staged burnoff in multiple zones, said catalyst having been deactivated during hydrocarbon processing, said process comprising:
  (a) introducting used particulate catalyst containing carbon and sulfur deposits into a first zone of a multiple zone regeneration vessel, and maintaining the catalyst in said zone at 300–500° F. temperature by contacting the catalyst with a heated inert gas for 1–2 hours residence time to evaporate lower boiling liquid components from the catalyst;
  (b) passing the oil-free catalyst from said first zone to a second zone and maintaining the catalyst in said second zone at 780°–800° F. temperature by contacting the catalyst in thin beds with a heated gas flow containing 0.5–1.0 V % oxygen in an inert gas for 4-6 hours residence time to partially burnoff carbon and sulfur deposits from the catalyst;

(c) passing the partially regenerated catalyst from said second zone to a third zone and maintaining the catalyst in said third zone at 800°-850° F. temperature by contacting the catalyst in thin beds with a heated gas flow containing 1-2 V % oxygen in an inert gas for 4-6 hours residence time to further burnoff carbon and sulfur deposits from the catalyst;

(d) passing the further regenerated catalyst from said third zone to a fourth zone and maintaining the catalyst therein at 800°-850° F. temperature by further contacting the catalyst with a heated gas flow containing 2-6 V % oxygen in an inert gas for 6-10 hours residence time to complete burnoff of carbon and sulfur deposits from the catalyst; and (e) withdrawing the regenerated catalyst from said fourth zone for further usage.

2. A catalyst regeneration process according to claim 1, wherein said gas is withdrawn from said second, third, and fourth zones and a major portion of the gas is recirculated to the zones along with sufficient oxygen to maintain the desired oxygen concentration therein.

3. A catalyst regeneration process according to claim 1, wherein said gas is withdrawn from said second, third, and fourth zones and a minor portion is cleaned to remove oxides of carbon, and sulfur before dicarding the cleaned gas to the atmosphere.

4. A catalyst regeneration process according to claim 1, wherein each oxygen-containing gas flow is passed radially outwardly across and through the multiple thin beds of catalyst to heat and regenerate the catalyst uniformly.

5. A catalyst regeneration process according to claim 1, wherein each oxygen-containing gas flow stream is passed separately through a heater to heat the gas to each said zone to the desired temperature for each zone.

6. A catalyst regeneration process according to claim 2, wherein the oxygen content in each recirculated hot gas stream is controlled by adding make-up air to each gas stream.

7. A catalyst regeneration process according to claim 6, wherein the regenerated catalyst withdrawn from the last regeneration zone is cooled against said make-up air before passing the regenerated catalyst to storage.

8. A catalyst regeneration process according to claim 1, wherein multiple zones are provided in a vertically oriented treatment vessel and each zone contains multiple trays of catalyst which are rotated while the catalyst bed depth on each tray is leveled to 0.5-2.0 inches for uniform burn-off of carbon and sulfur deposits by the hot gas.

9. A catalyst regeneration process according to claim 8, wherein the catalyst in each zone is contained on multiple rotating trays, the catalyst on each tray is moved downwardly onto successive trays, and the oxygen-containing gas flows are passed across and through the catalyst on each tray.

10. A catalyst regeneration process according to claim 4, wherein said gas flow is passed radially outwardly across and through said beds of catalyst by rotary fans located adjacent the inner annular surface of the beds.

11. A catalyst regeneration process according to claim 4, wherein said gas flow is passed radially outwardly across and through said beds of catalyst by nozzles located opposite the inner annular surface of each bed.

12. A catalyst regeneration process according to claim 1, wherein the multiple zones are provided within a horizontal treatment vessel and the catalyst is moved through said zones in succession by a moving belt conveyor for contacting the catalyst with the heated gas flows.

13. A catalyst regeneration process according to claim 12, wherein the fourth zone is provided in a separate horizontal treatment vessel containing a moving belt conveyor for contacting the catalyst with the heated oxygen-containing gas.

14. A process for continuous regeneration of used catalyst containing carbon and sulfur deposits by staged burnoff in multiple zones, said catalyst having been deactivated during hydrocarbon processing, said process comprising:

(a) introducing used particulate catalyst containing carbon and sulfur deposits into the uppermost first zone of a vertically oriented multiple zone regeneration vessel, and maintaining the catalyst in said zone at 300°-500° F. temperature by contacting the catalyst with an inert gas for 1-2 hours residence time to evaporate low-boiling liquid components from the catalyst;

(b) passing the oil-free catalyst from the uppermost first zone to a next lower second zone containing multiple trays, maintaining the catalyst in a thin bed between about 0.5-2.0 inches thick in the second zone at 780°-800° F. temperature, and contacting the catalyst with a gas flow containing 0.5-1.0 V % oxygen in an inert gas for 4-6 hours residence time to partially burnoff carbon and sulfur deposits from the catalyst;

(c) passing the partially regenerated catalyst from said second zone downwardly to a third zone containing multiple trays and maintaining the thin bed of catalyst between about 0.5-2.0 inch thick in the third zone at 800°-850° F. temperature by further contacting the catalyst with a gas flow containing 1-2 V % oxygen in an inert gas for 4-6 hours residence time to further burnoff carbon and sulfur deposits from the catalyst;

(d) passing the further regenerated catalyst from said third zone downwardly to a fourth zone containing multiple trays and maintaining the thin bed of catalyst between about 0.5-2.0 inch thick in the fourth zone at 800°-850° F. temperature by further contacting the catalyst with gas flow containing 2-6 V % oxygen in an inert gas for 6-10 hours residence time to complete burnoff of carbon and sulfur deposits from the catalyst;

(e) withdrawing the regenerated catalyst from said lowest fourth zone and passing it to a screening step for removing undesired fines before passing the remaining catalyst to storage.

* * * * *